March 3, 1959

B. H. EAKIN 2,875,751

OPTICAL INSTRUMENT

Filed Jan. 24, 1957

INVENTOR
BIRCH H. EAKIN,

BY

ATTORNEY

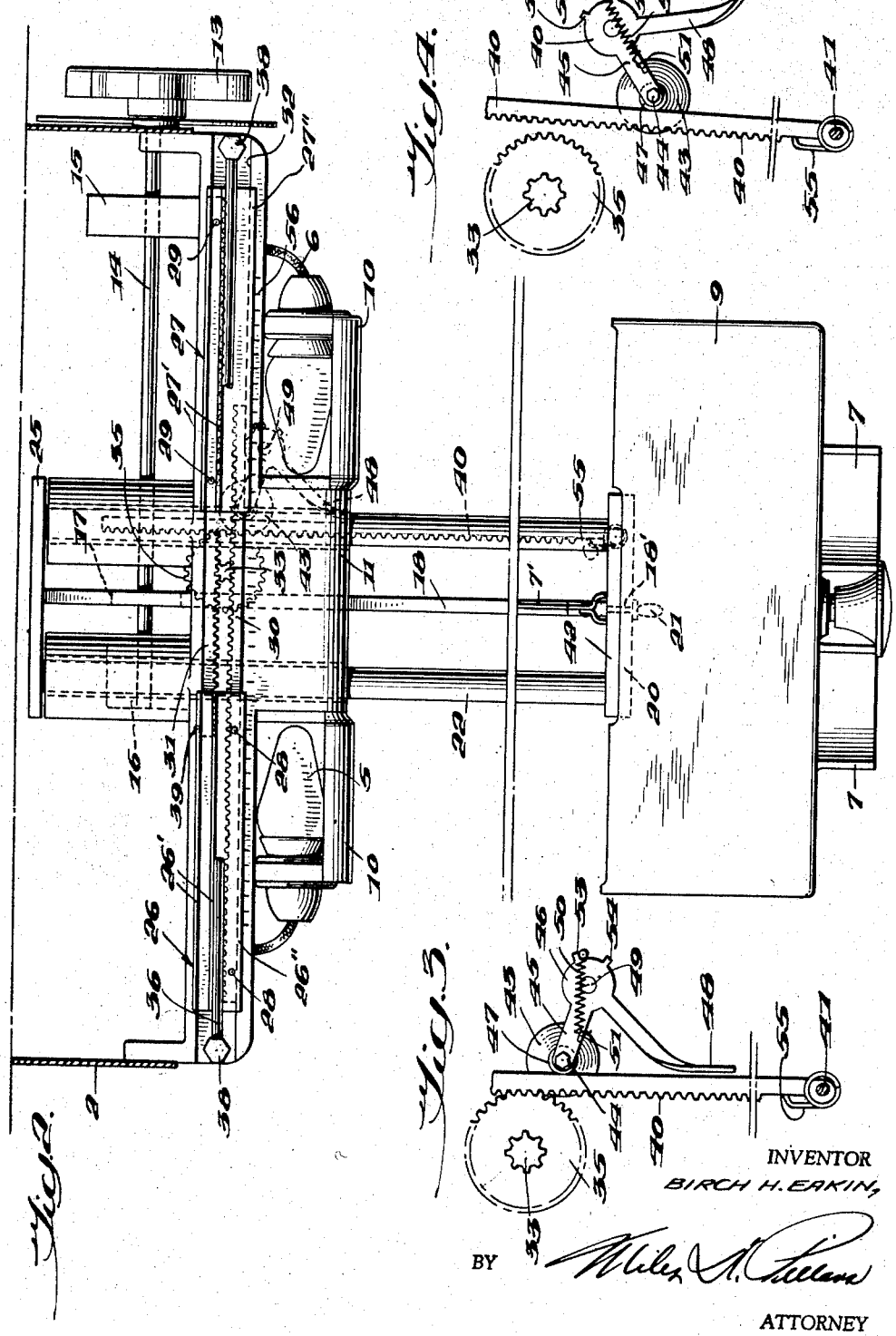

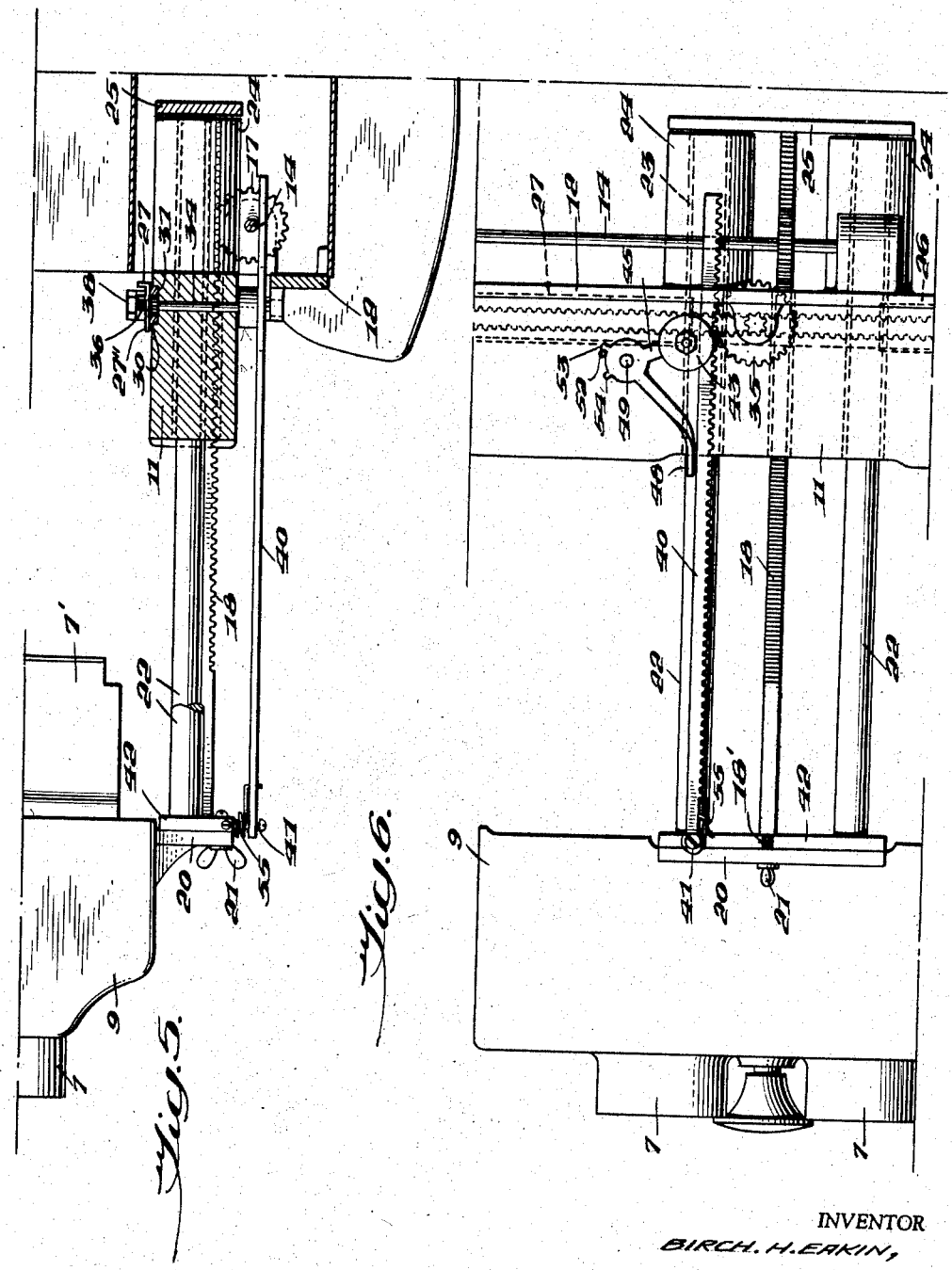

United States Patent Office 2,875,751
Patented Mar. 3, 1959

2,875,751

OPTICAL INSTRUMENT

Birch H. Eakin, Silver Spring, Md.

Application January 24, 1957, Serial No. 636,191

4 Claims. (Cl. 128—76.5)

This invention relates to optical instruments for testing and training binocular vision.

In optical instruments for correcting vision deficiencies various types of structures have been developed for training and correcting eye muscles and the psychological reaction to vision in the different eyes of a patient. Generally speaking, such optical instruments are provided with slides or targets adapted to be viewed through a stereoscope such that a target or slide must be provided for each eye. The patient's eyes generally tend to converge in viewing two slides of the same picture and the convergence of the patient's eyes may be controlled by the optical separation of the lenses in the sights of the instrument and by the separation of the targets. The distance from one point on one picture to the same point on the other picture is to be understood to be the separation of the targets, that is, the separation or spacing is the distance between similar points on the two targets or slides.

If a patient were to look at an object located at infinity, the rays of light would reach his eyes in substantially parallel lines and there would be no convergence of the patient's eyes if he were to have substantially normal vision. In the same manner, in looking through lenses in a stereoptic type instrument, if the targets are properly separated or spaced apart in a line transverse of the instrument and parallel to the lenses of the binocular sights, the patient's eyes will view the targets along parallel rays of light. For various types of lenses the separation of the targets can easily be calculated by use of the well-known Prentice prism formula:

$$\frac{\text{Displacement in millimeters}}{\text{Distance in millimeters}} = \frac{\text{Prism Diopters}}{100 \text{ centimeters}}$$

For any particular distance of the sights from the targets the displacement between the targets for obtaining the effect of viewing the targets at infinity can be calculated by this formula and the position at which there is no prismatic effect, that is, where the targets and lenses have the same separation, is known as the mathematical orthophoric position. At any position of a target other than infinity, eyes must normally converge and accommodate themselves a definite amount. Thus, in using a binocular-type optical instrument for training and testing eyes there is a definite orthophoric separation of the targets for each specific distance of the binocular sight lenses from the transverse line of the targets. It has been found, however, that there is a psychological exception to the mathematical orthophoria concept. Most persons will try to converge their eyes slightly, realizing that the targets are not actually at infinity but closer to them. This psychologic convergence due to the awareness of the nearness of the targets cannot be calculated accurately, but it generally is taken into account in targets made for stereoptic instruments. This "psychic convergence" will vary somewhat with each patient. It is desirable therefore that the separation or spacing of the targets should be adjustable to provide for this difference from the true mathematical orthophoric relationship.

In the use of optical instruments for training a person's vision, it is desirable that the person be able to accommodate his eyes for different distances from the lenses to the targets while maintaining a predetermined desired orthoptic relation between the spacing of the targets and the distance of the stereoptic lens sights from the transverse line of the targets.

An object of this invention is to provide an improved optical instrument having a pair of sights for viewing targets and a pair of mounts for supporting the targets which can simultaneously be moved towards and away from each other in a predetermined relation.

Another object of this invention is to provide an improved optical instrument for training binocular vision in which the spacing between a pair of target mounts is automatically and simultaneously varied in a predetermined orthoptic relation to variations in the distance of the instrument sights from the transverse line of the targets.

A further object of this invention is to provide an improved optical instrument for binocular vision training and testing in which the distance from the binocular sights to a pair of target mounts can be manually varied in a predetermined corresponding relation to variations between the separation of the target mounts, with means for readily manually connecting and disconnecting the drive which provides the predetermined relationship, such that an adjustment can readily be made between the spacing of the target mounts and the relative distance of the binocular sights from the transverse line of the target mounts.

Further objects and advantages of this invention will become apparent and it will be better understood from the following description referring to the accompanying drawings, and the features of novelty which characterize this invention will be pointed out with particularity in the claims annexed hereto and forming a part of this specification.

In the drawings:

Fig. 2 is an enlarged plan view, partly in section and partly broken away, of the forepart of the instrument shown in Fig. 1, illustrating the parts thereof comprising the improved structure of the embodiment of this invention shown in Fig. 1;

Fig. 3 is a plan view of a part of the driving mechanism for the target mounts shown in dotted lines in Fig. 2 and of the device for biasing the driving mechanism into operative position and for releasing it therefrom, shown in operative position;

Fig. 4 illustrates the mechanism shown in Fig. 3 with the drive released from its operative engagement;

Figure 1:
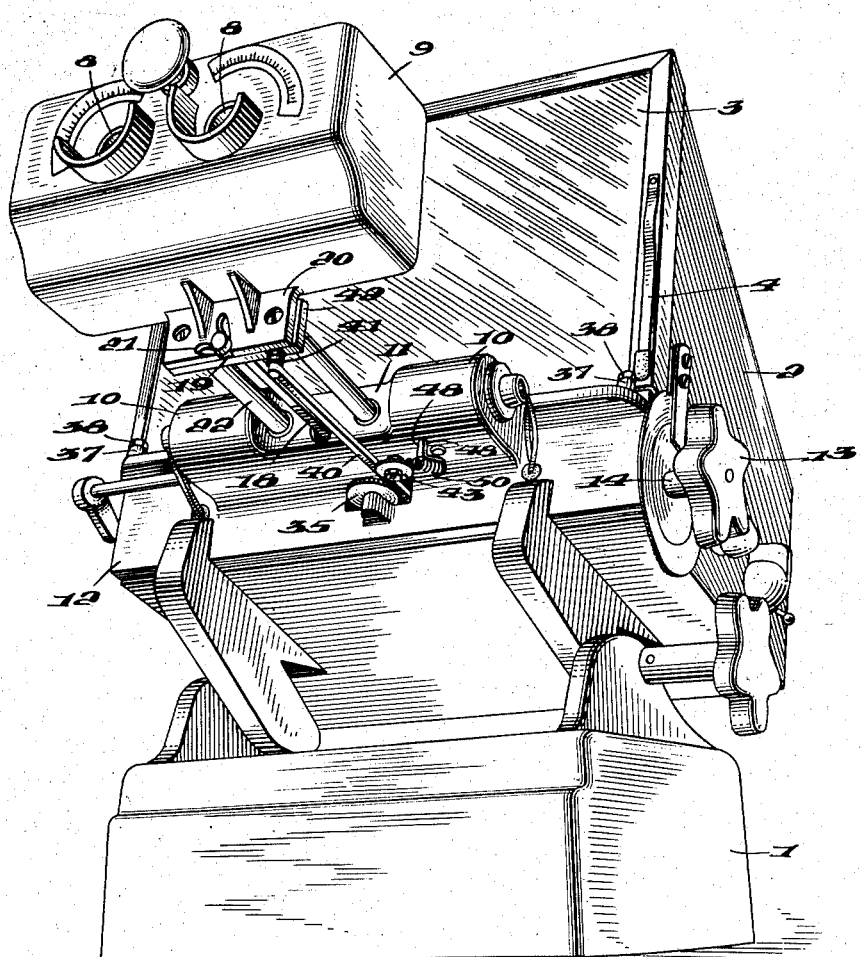
Fig. 1 is a perspective view of an optical instrument of a well-known type provided with an embodiment of this invention.

Fig. 5 is a side elevational view, partly in section and partly broken away, of the part of the optical instrument shown in Fig. 2, illustrating in greater detail the arrangement of the mechanism for driving the target mounts; and Fig. 6 is a plan view of a part of the instrument shown in Fig. 2 as seen from the underside of the instrument, showing in detail the mechanism for driving the binocular sights and the target mounts, together with the device for releasing the driving connection therebetween to provide for ready adjustment of the predetermined orthoptic relation of the spacing of the target mounts to the distance of the binocular sights from the transverse line of the target mounts.

Referring to the drawings, an embodiment of this invention is illustrated in connection with a well-known conventional type optical instrument for training and testing eyes. This conventional instrument is mounted upon a supporting base 1 and comprises a main housing 2 in which suitable sources of illumination are arranged for transmitting light through a translucent screen 3 for illuminating slides or targets which may be placed upon the screen and held in position by suitable spring retaining clamps 4. Illumination of targets upon the screen 3 can also be provided by a pair of light sources comprising electric light bulbs 5 or other similar suitable light emitting sources. The bulbs 5 are adapted to be supplied with the desired illuminating electric current through conductors 6 and their energization is controlled by a suitable switching mechanism, which does not form a part of this invention. The targets are adapted to be viewed by a patient through suitable stereoptical sights, which include a pair of lens holders 7 and a pair of suitable lenses 8 arranged in a sight compartment 9. The individual viewing of each target by the patient's eye on the same respective side as the target is assured by a septum 7', which extends, as shown in Fig. 5, from the sight compartment 9 towards the targets along a center-line between the lenses and the targets. In order to minimize glare from the bulbs 5, when these are used for illuminating the targets, light shields 10 are arranged around the front and undersides of the bulbs 5 and are connected together by a bridging member 11 formed as a part of the lower front panel 12 of the main housing 2.

The conventional machine includes a mechanical driving arrangement for varying the distance of the sights from the targets which are being viewed by the patient, and includes a manually operable drive which enables the patient or doctor to adjust the position of the sights in relation to the targets. This manually operable adjusting mechanism includes a suitable control knob 13, arranged on the side of the main housing adjacent the front thereof and mounted on an operating rod 14, supported in suitable bearing brackets 15 and 16, preferably formed as bosses integral with the front housing panel 12. A gear drive connects the sight compartment 9 to the control knob 13 for moving the sights toward and away from the plane of the targets which are mounted on the screen 3. This drive includes a gear 17 mounted on the rod 14 and arranged in driving engagement with a gear rack 18, secured to the sight compartment 9. As is more clearly shown in Figs. 1 and 5, the gear rack extends through a slot 19 in a mounting flange 20 on the underside of the sight compartment 9 and is rigidly secured to the sight compartment by a wing nut 21 which threadedly engages a threaded end 18' of the rack 18 extending through the slot 19.

In order to facilitate adjustment of the sights relative to the targets on the screen 3, the sight compartment 9 is supported by a pair of mounting rods 22, slidably supported in bearings 23, mounted in the front panel bridging member 11, and a pair of bosses 24, extending inwardly from the inner face of the front panel 12 of the main housing 2. Preferably, the inner ends of the mounting rods 22 are secured together by a brace 25 extending across the inner ends thereof and providing a stop which limits the outward movement of the mounting rods 22, and, therefore, of the sight compartment 9.

This type of stereoptic instrument for testing and training a patient's eyes usually is provided with a number of controls for varying the illumination of the targets, so as to provide a variety of desirable exercises for a patient's eyes. It has been found desirable, however, to provide additional corrective exercises for certain types of eye deficiencies, and in particular to correct deficiencies in the normal binocular vision of a patient with certain orthophoric maladjustments. In accordance with the present invention, an optical instrument of the foregoing conventional type can be provided with a pair of target mounts spaced substantially equidistantly from a center on a line transverse of the instrument and centered relative to the sights in the sight compartment 9, with a special interrelated driving arrangement to provide for simultaneously transversely moving the target mounts toward and away from each other as the sights are moved toward and away from the transverse line of the target mounts.

In the illustrated embodiment of this invention, a pair of target mounts 26 and 27 are shown transversely spaced apart on a line transverse of the instrument and arranged directly in front of the screen 3. These target mounts preferably are formed with a pair of flanges 26' and 27' for supporting slides or targets thereon and are respectively secured by any suitable means, such as screws 28 and 29, to a pair of transversely extending gear racks 30 and 31. These gear racks 30 and 31 are slidably seated in a track 32 formed as a groove in the upper surface of the front panel 12 of the main housing, and are adapted to be driven by a gear 33, mounted upon a shaft 34, which extends vertically through the bridging member 11 and is adapted to be driven by a gear 35 secured to the lower end of the shaft 34. As is more clearly shown in the sectional portion of Fig. 5, the target mounts 26 and 27 preferably are formed with outwardly extending base flanges 26" and 27", which extend across and substantially cover the groove which forms the track 32 for the gear racks 30 and 31 and serve to hold the gear racks in position in the track 32. Any suitable means may be provided for retaining the target mounts slidably in position, such as a rod 36, which extends transversely of the instrument in sliding engagement with the upper surface of the flanges 26" and 27" of the target mounts. The ends of the retaining rod 36 are secured to binding posts 37 which are mounted on the ends of the track 32 by suitable screws 38. In order to maintain the rack 31 in good driving engagement with the gear 33, a biasing pin 39 preferably is provided, which extends slightly into the track 32 on the inner side thereof and engages the adjacent inner side of the rack 31 so as to bias the rack slightly forwardly, as is more clearly shown in Fig. 2.

In order to drive the target mounts 26 and 27 in a predetermined orthoptic relation to relative movement of the sights, a gear rack 40 is pivotally secured by a suitable mounting pin 41 to the underside of a brace 42, which secures together the ends of the mounting rods 22 adjacent to the flange 20 on the underside of the sight compartment 9. This brace 42 is rigidly secured to the sight compartment flange 20 by the wing nut 21. In order to provide the desired driving connection between the sights and the target mounts, the end of the gear rack 40, adjacent to the gear 35, is supported by a manually operable two-position over-center biasing device which comprises a suitable relatively large supporting washer 43, mounted on a pin 44, secured to an arm 45 of an over-center biasing device base 46. The over-center biasing device is provided with a roller 47 which is adapted to engage the outer smooth side of the rack 40, opposite to the teeth of the rack, for biasing the rack into driving engagement with the gear 35.

The biasing device is adapted to be operated by a manually engageable lever 48 which extends from the base 46 for turning the base 46 into one of its two normal positions. These two positions of the base 46 correspond to a position in which the roller 47 biases the rack 40 into engagement with the gear 35, as more clearly shown in Fig. 3, and to a position in which the roller 47 releases the driving engagement between the rack 40 and the gear 35, as is more clearly shown in Fig. 4. The rack supporting and biasing device is adapted to be pivotally supported on the underside of the bridging member 11 of the main housing front panel 12 by a pivot pin 49, and to be biased into its two operative positions by a suitable tension spring 50, secured to an upturned tab 51 on an edge of the arm 45 and to a position limiting pin 52 secured to the underside of the bridging member 11. The biasing device base 46 is formed with a pair of fingers 53 and 54 extending radially therefrom, which are adapted to engage the pin 52 to act as stops for limiting the positions of the biasing device base 46. As shown in Fig. 3, the spring 50 biases the base 46 and its associated arm 45, lever 48, and finger 53 in a clockwise direction when the lever 48 is pushed toward the rack 40, into a position in which the spring 50 is past the center of the pin 49 on the side thereof nearest the finger 53. In this position, the finger 53 is biased into engagement with the pin 52 and stops or limits the clockwise turning of the biasing device base 46 to a position in which the arm 45 biases the roller 47 against the gear rack 40 and places the teeth of the gear rack 40 in operative engagement with the gear 35, as shown in Figs. 2, 3, and 6. In this position of the biasing device, the control knob 13 is adapted to drive the sights longitudinally toward and away from the transverse line of the target mounts 26 and 27, through the rod 14, the gear 17, and the rack 18, and correspondingly simultaneously to drive the target mounts 26 and 27 toward and away from each other in a predetermined orthoptic relation to the movement of the sights through the driving mechanism including the pivotally mounted gear rack 40, the gear 35, the shaft 34, gear 33, and the oppositely driven gear racks 30 and 31.

In accordance with this invention, the connection between the manually operable control knob 13, which provides a correlated drive between the sights and the target mounts, is adapted to be released in order to provide for adjustment between the spacing of the target mounts and the relative distance of the sights from the transverse line of the target mounts. In the illustrated embodiment of this invention, this release can readily be obtained by disconnecting the driving engagement between the sights and the target mounts through the gear rack 40 and the gear 35. As shown in Fig. 4, a simple turning in a counterclockwise direction of the operating lever 48 of the rack biasing device will turn the base 46 and its associated arm 45 and fingers 53 and 54 so that the tension spring 50 is moved to a position on the side of the center of the pivot pin 49 adjacent the finger 54. In this over-center position of the spring 50, the biasing device base 46 and all of its associated parts are resiliently biased in a counterclockwise direction, as viewed in Fig. 4, with the fingers 54 in engagement with the pin 52, thus limiting this counterclockwise angular turning of the base 46. This movement of the base 46 and of the arm 45, carries the roller 47 away from the gear 35, and a torsion coil spring 55 is arranged with one end secured to the brace 42 and the other end thereof arranged in biasing engagement with the adjacent end of the gear rack 40, so as to be in a position tending to move the gear rack 40 out of operative engagement with the gear 35, into the position shown in Fig. 4. Thus, by simply manually moving the biasing device lever 48 toward the gear 35, a driving engagement is provided between the gear rack 40 and gear 35, and by moving the lever 48 in a direction away from the gear 35, the driving engagement between the gear rack 40 and the gear 35 is disconnected. When this driving engagement is disconnected, the relative position of the sights and the target mounts can be changed simply by turning the operating knob 13, so as to drive the sight compartment 9 toward or away from the transverse line of the target mounts, without changing the separation of the target mounts. After the relative position of the sights to the target mounts has been adjusted, the desired operating connection between the sights and the target mounts can be reestablished simply by manually turning the biasing device lever 48 toward the gear 35, so as to reestablish a driving engagement between the gear-rack 40 and the gear 35. In this manner a large number of different relative positions may be obtained for the relative spacing between the target mounts and the distance of the sights from the transverse line of these mounts. In actual practice only a relatively small amount of adjustment is required, and, in most instances, the most desirable relative position and driving relation between the sights and the target mounts is obtained by moving the sight compartment 9 all the way in toward the front panel bridging member 11 and moving the inner adjacent edges of the target mounts 26 and 27 inwardly into engagement with each other. This can be done by engaging and disengaging the driving connection between the rack 40 and the gear 35, as previously explained, and by turning the manually operable knob 13 until the desired relative positions of the target mounts and the sight compartment are obtained. Furthermore, since the targets can be adjusted in relation to their positions on the target mounts, in many instances it may be found more convenient simply to move the targets, keeping them centered, that is, equally spaced from the center of the transverse line of the sights corresponding to the center of the sights. In order to aid in thus centering targets, a scale 56 can be placed on the upper surface of the front panel 12, which indicates the distance on each side of the center of the line of the mounts and sights.

While a particular structural driving arrangement and means for releasing the operative connection between the sights and the target mounts have been described in connection with the illustrated embodiment of this invention, modifications of this embodiment will occur to those skilled in the art. It is to be understood, therefore, that this invention is not to be limited to the particular details and arrangement disclosed, and it is intended in the appended claims to cover all such modifications within the spirit and scope of this invention.

I claim:

1. An optical instrument comprising a pair of target mounts spaced apart on a line transverse of the instrument and formed with target holding flanges adapted to support targets to be viewed by a patient, means comprising a pair of sights for viewing the targets, means including a pair of longitudinally extending rods for supporting said sights longitudinally slidable towards and away from the transverse line of said target mounts, a manually operable member including a rod with a driving gear element thereon and a control knob on one end thereof, means including a gear rack operably connected to said driving gear element and to said sights for operating said sights longitudinally towards and away from the transverse line of said target mounts by said control knob, means including gearing comprising a rack pivotally secured to said sights and correspondingly longitudinally movable therewith and gearing operatively connecting said latter rack and to said target mounts for transversely moving said mounts towards and away from each other in a predetermined orthoptic relation to operation of said sights respectively towards and away from the transverse line of said target mounts, means biasing said latter rack out of operative engagement with said gearing, and manually operable means including a two-position overcenter rack-supporting and biasing device for supporting the adjacent end of said latter rack and biasing said latter rack into operative engagement with said gearing in one position and for releasing the bias thereof on said latter rack in the other position whereby the driving engagement is disconnected between said target mounts and said sights providing for adjustment between the spacing of said target mounts and the relative distance of said sights from the transverse line of said target mounts.

2. An optical instrument comprising a pair of target mounts spaced apart on a line transverse of the instrument adapted to support targets to be viewed by a patient, means comprising a pair of sights for viewing the targets, means for supporting said sights slidable towards and away from the transverse line of said target mounts, a manually operable member including a driving gear element, means including a gear rack operably connected to said driving gear element and to said sights for operating said sights longitudinally towards and away from the transverse line of said target mounts by said manually operable member, means including gearing comprising a rack pivotally secured to said sights and correspondingly movable therewith and gearing operatively connecting said latter rack and to said target mounts for transversely moving said mounts towards and away from each other in a predetermined orthoptic relation to operation of said sights respectively towards and away from the transverse line of said target mounts, means biasing said latter rack out of operative engagement with said gearing, and manually operable means including a two position overcenter rack-supporting and biasing device for supporting the adjacent end of said latter rack and biasing said latter rack into driving engagement with said gearing in one position and for releasing the bias thereof on said latter rack in the other position whereby the driving engagement is disconnected between said target mounts and said sights providing for adjustment between the spacing of said target mounts and the relative distance of said sights from the transverse line of said target mounts.

3. An optical instrument comprising a pair of target mounts spaced apart on a line transverse of the instrument and formed with target holding flanges adapted to support targets to be viewed by a patient, means comprising a pair of sights for viewing the targets, means for supporting said sights movable towards and away from the transverse line of said target mounts, a manually operable member having a driving gear element and a control knob, means including a gear rack operably connected to said driving gear element and to said sights for operating said sights towards and away from the transverse line of said target mounts by said control knob, means including gearing comprising a rack pivotally secured to said sights and correspondingly movable therewith and gearing operatively connecting said latter rack and to said target mounts for transversely moving said mounts towards and away from each other in a predetermined relation to operation of said sights respectively towards and away from the transverse line of said target mounts, means biasing said latter rack out of operative engagement with said gearing, and means including a two position overcenter rack-supporting and biasing device for biasing said latter rack into engagement with said gearing in one position and for releasing the bias thereof on said latter rack in the other position.

4. An optical instrument comprising a pair of target mounts supported spaced substantially equidistantly from a center on a line transverse of the instrument and adapted to support targets to be viewed by a patient, means comprising a pair of sights for viewing the targets, means including a pair of longitudinally extending rods for supporting said sights slidable towards and away from the transverse line of said target mounts and centered relative to said center on the transverse line of said target mounts, means including a manually operable member with a driving gear element and a gear rack operably connected to said driving gear element and to said sights for driving said sights towards and away from the transverse line of said target mounts, means operatively connecting said manually operable means to said target mounts for driving said target mounts transversely towards and away from each other equidistantly from the center between said target mounts in a predetermined orthoptic relation to the driving of said sights respectively towards and away from the transverse line of said target mounts, and manually operable means including a rack-supporting and biasing device for supporting the adjacent end of said latter rack and for biasing said rack into operative engagement with said driving gear element and for releasing the operative connection between said sights and said target mounts.

References Cited in the file of this patent

UNITED STATES PATENTS 2,491,242     Alexander  ------------ Dec. 13, 1949